United States Patent [19]

Shay et al.

[11] Patent Number: 4,722,962

[45] Date of Patent: Feb. 2, 1988

[54] NONIONIC ASSOCIATIVE THICKENERS

[75] Inventors: Gregory D. Shay, Oak Forest; Fran K. Kravitz, Chicago, both of Ill.

[73] Assignee: DeSoto, Inc., Des Plaines, Ill.

[21] Appl. No.: 873,587

[22] Filed: Jun. 12, 1986

[51] Int. Cl.$^4$ ............... C08L 37/00; C08F 126/02; C08F 226/02
[52] U.S. Cl. .................. 524/548; 526/263; 526/301; 524/555
[58] Field of Search ............ 526/301, 263; 524/548, 524/555

[56] References Cited

U.S. PATENT DOCUMENTS

| | | | |
|---|---|---|---|
| 4,268,641 | 5/1981 | Koenig et al. | 525/367 |
| 4,514,552 | 4/1985 | Shay et al. | 526/301 |
| 4,600,761 | 7/1986 | Ruffner et al. | 526/301 |

FOREIGN PATENT DOCUMENTS 0101267 2/1984 European Pat. Off. ............ 526/301

Primary Examiner—Joseph L. Schofer
Assistant Examiner—Peter F. Kulkosky
Attorney, Agent, or Firm—Dressler, Goldsmith, Shore, Sutker & Milnamow, Ltd.

[57] ABSTRACT

Nonionic associative thickeners suitable for use in aqueous coating compositions comprise an aqueous solution polymer of (a) from about 40 percent to about 98 percent, preferably from 60 to 95 percent, by weight of a monoethylenically unsaturated monomer such as acrylamide, N,N-dimethyl acrylamide, vinyl pyrrolidone, hydroxyethyl acrylate and mixtures thereof; and (b) from about 2 percent to about 60 percent, preferably from 5 to 40 percent, by weight of a nonionic urethane monomer which is the urethane reaction product of a monohydric nonionic surfactant with a monoethylenically unsaturated monoisocyanate.

16 Claims, No Drawings

NONIONIC ASSOCIATIVE THICKENERS

TECHNICAL FIELD

The present invention relates to aqueous solution polymers that are soluble in aqueous medium to provide nonionic associative thickeners for use in aqueous coating compositions.

BACKGROUND OF THE INVENTION

Thickeners for aqueous systems are needed for various purposes. For example, thickeners are used in latex paints to provide the desired viscosity and to stabilize emulsions and pigment dispersions. Thickeners are also used in the preparation of cosmetics and pigment pastes, textile manufacturing and in many processes that involve the treatment of water including oil drilling and enhanced oil recovery operations.

Hydroxyethyl cellulose is a conventional thickener for aqueous systems, but it has various deficiencies in that excessive amounts must be used and the rheology of the thickened system is often inadequate. Other conventional thickeners include polyacrylamide, polyvinyl pyrrolidone, polyvinyl alcohol and similar polymers. Various ethoxylated carboxyl-functional polymers which form alkali soluble thickeners are also known, but these also have various deficiencies, including inadequate hydrolytic stability.

U.S. Pat. No. 4,514,522 to Shay et al. describes alkali soluble latex thickeners that are particularly useful in increasing the viscosity and improving the rheology of a latex paint. Such thickeners, however, are somewhat sensitive to pH changes and high salt concentrations.

It has long been desired to provide superior thickeners for aqueous systems which are highly efficient, and which better resist hydrolysis and provide better rheology than conventional thickeners. It is particularly desirable to provide thickeners for aqueous systems having improved thickening efficiency over materials such as polyacrylamide and the like without the salt and pH sensitivities of the anionic thickeners described in the foregoing patent.

DISCLOSURE OF THE INVENTION

The present invention relates to nonionic associative thickeners that comprise an aqueous solution polymer of:

(a) from about 40 percent to about 98 percent, preferably from 60 to 95 percent and more preferably from 70 to 95 percent, by weight of a water-soluble or partially water-soluble monoethylenically unsaturated monomer or mixtures thereof, for example, acrylamide, N,N-dimethyl acrylamide, vinyl pyrrolidone and hydroxyethyl acrylate; and (b) from about 2 percent to about 60 percent, preferably 5 percent to 40 percent and more preferably from 5 to 30 percent, by weight of a nonionic urethane monomer which is the urethane reaction product of a monohydric nonionic surfactant with a monoethylenically unsaturated monoisocyanate, such as isocyanato ethyl methacrylate (IEM), but preferably one lacking ester groups such as alpha, alpha-dimethyl-m-isopropenyl benzyl isocyanate (or m-TMI). The para-substituted derivative (p-TMI) is also suitable.

Minor amounts of other monofunctional or polyfunctional monomers including styrene, vinyl toluene, butyl acrylate, methyl methacrylate, vinylidene chloride, vinyl acetate and the like may also be added provided the water solubility of the polymer is maintained. For example, up to about 2 weight percent of a polyethylenically unsaturated monomer such as ethylene glycol diacrylate, 1,6-hexanediol diacrylate, the corresponding methacrylates, diallyl benzene and the like may be used.

The polymer must include a significant proportion, as defined above, of one ore more water-soluble or partially water-soluble monoethylenically unsaturated monomers. The preferred monomers provide water-soluble polymers when homopolymerized and are illustrated by acrylamide, N,N-dimethyl acrylamide, vinyl pyrrolidone, hydroxyethyl acrylate and the like. Nonreactive monomers are preferred, these being monomers in which the single ethylenic group is the only group reactive under the conditions of polymerization. However, monomers which include groups reactive under baking conditions may be used in some situations, like hydroxyethyl acrylate.

The monohydric nonionic surfactant component of component (b) is subject to considerable variation. The essence of the surfactant is a hydrophobe including a polyethyoxylate chain (which may include some polypropoxylate groups) and which is terminated with a single hydroxy group.

The monohydric nonionic surfactants that are particularly suitable for use herein include ethoxylated hydrophobes containing adducted ethylene oxide to provide the hydrophilic portion of the molecule. The hydrophobes usually include an aliphatic alcohol or alkyl phenol in which a carbon chain containing at least 6 carbon atoms provides the hydrophobic portion of the surfactant. These surfactants are illustrated by ethylene oxide adducts of dodecyl alcohol, octyl alcohol, nonyl phenol and dinonyl phenol which are available in commerce and which contain from about 5 to about 150 moles, preferably from 10 to 60 moles, of ethylene oxide per mole of hydrophobe.

The preferred surfactants can be represented by the formula:

$$R-O-(CH_2-CHR'O)_{\overline{m}}(CH_2-CH_2O)_{\overline{n}}H$$

wherein R is an alkyl group containing 6–22 carbon atoms (typically dodecyl) or an alkaryl group containing 8–22 carbon atoms (typically octyl phenol, nonyl phenol or dinonyl phenol) R' is $C_1$–$C_4$ alkyl (typically methyl), n is an average number from about 6–150, and m is an average number of from 0–50 provided n is at least as great as m and the sum of n and m equals 150.

When the hydroxy-terminated polyethoxylate used herein is reacted with a monoethylenically unsaturated monoisocyanate, the reaction product is a monoethylenically unsaturated urethane in which a polyethoxylate structure is associated with a copolymerizable monoethylenic group through a urethane linkage.

It will be understood, however, that urethanes can be made by various procedures, so the urethane reaction product used herein can be prepared in any desired manner recognized by those skilled in the art so long as the product is essentially the same as that made by the reaction of the components named herein.

The monoethylenically unsaturated monoisocyanate used to provide the nonionic urethane monomer is also subject to wide variation. Any copolymerizable unsaturation may be employed, such as acrylate and methacrylate unsaturation. Allylic unsaturation, as provided by allyl alcohol, may also be used. These, preferably in the form of an hydroxy-functional derivative, as is obtained by reacting a $C_2$–$C_4$ monoepoxide, like ethylene oxide, propylene oxide or butylene oxide, with acrylic or methacrylic acid to form an hydroxy ester, are reacted in equimolar proportions with an organic diisocyanate, such as toluene diisocyanate or isophorone diisocyanate. The more preferred monoethylenically unsaturated monoisocyanates include styryl unsaturation, as in alpha, alpha-dimethyl-m-isopropenyl benzyl isocyanate (or m-TMI), which is an unsaturated monoisocyanate that lacks ester functionality so it forms urethanes which also lack ester functionality. The para-substituted derivative (p-TMI) may also be used.

The materials described herein were prepared by aqueous solution polymerization. Other polymerization methods are equally suitable, however, including polymerization in an organic solvent, emulsion polymerization, inverse emulsion (organic continuous phase) polymerization, suspension, precipitation polymerization, polymerization in bulk and the like as will be recognized by those skilled in the art.

The present invention is illustrated by the following Examples wherein all proportions are by weight unless otherwise indicated. The monoethylenically unsaturated monomer illustrated in the following Examples is acrylamide. It will be understood, however, that other monomers including, but not limited to, N,N-dimethyl acrylamide, vinyl pyrrolidone, hydroxyethyl acrylate and mixtures thereof may be used.

EXAMPLE 1–10

Aqueous solution polymers (Examples 1–10) were prepared simultaneously in a thermostatted water bath having ten compartments for sample bottles. Deionized water (570 grams) was first charged to each of 10 one quart bottles at room temperature followed by the amounts of acrylamide and urethane monomer (Examples 1–9) or ester monomer (Example 10) shown in Table I.

The contents of each bottle were then purged with nitrogen for a two hour period at which point 2.4 milliliters (ml) of a 1 percent aqueous solution of tetrasodium EDTA (ethylene diamine tetra acetic acid) were charged followed by 0.67 ml of a 10 percent aqueous solution of ammonium persulfate. The bottles were capped immediately after discontinuing the nitrogen purge and were placed in a rotating bottle holder in the water bath at 50 degrees C. The bath was maintained between 50 and 60 degrees C for a 2 hour period and then was maintained at 60 degrees C for an additional 16 hours. The bottles were removed, and the contents were drained and cooled for characterization.

Referring to Table I, the product of Example 1 is a polyacrylamide prepared by the foregoing method that was used as a control. The products of Examples 2–9 are modified-polyacrylamides of this invention. The product of Example 10 is a non-urethane containing-polyacrylamide which is included for purposes of comparison.

TABLE I

| | REACTOR CHARGE | | | REACTION CONDITIONS | | | | |
|---|---|---|---|---|---|---|---|---|
| | | | | URETHANE MONOMER COMPOSITION | | | | |
| EXAMPLE | DEIONIZED WATER (grams) | ACRYLAMIDE (grams) | URETHANE MONOMER (grams) | URETHANE MONOMER CODE | UNSATURATED MONOISOCYANATE | ETHOXYLATED NONIONIC SURFACTANT*** | ETHYLENE OXIDE UNITS | TERMINAL HYDROPHOBE |
| 1 | 570.00 | 30.00 | NONE | NONE | NONE | NONE | NONE | NONE |
| 2 | 570.00 | 28.50 | 1.50 | A | m-TMI** | IGEPAL DM-880 | 50 | DINONYL PHENOL |
| 3 | 570.00 | 28.50 | 1.50 | B | m-TMI | IGEPAL DM-970 | 150 | DINONYL PHENOL |
| 4 | 570.00 | 28.50 | 1.50 | C | m-TMI | IGEPAL CO-730 | 15 | NONYL PHENOL |
| 5 | 570.00 | 28.50 | 1.50 | D | m-TMI | IGEPAL CO-880 | 30 | NONYL PHENOL |
| 6 | 570.00 | 28.50 | 1.50 | E | m-TMI | IGEPAL CO-970 | 50 | NONYL PHENOL |
| 7 | 570.00 | 28.50 | 1.50 | F | m-TMI | IGEPAL CO-990 | 100 | NONYL PHENOL |
| 8 | 570.00 | 28.50 | 1.50 | G | m-TMI | IGEPAL CO-890 | 40 | OCTYL PHENOL |
| 9 | 570.00 | 28.50 | 1.50 | H | m-TMI | SIPONIC L-25 | 25 | LAURYL |
| 10 | 570.00 | 28.50 | 1.50 | LEM-25* | — | SIPONIC L-25 | 25 | LAURYL |

*SIPOMER LEM-25 is a proprietary non-urethane methacrylic acid ester monomer that is commercially available from Alcolac Corp.
**m-TMI is alpha, alpha-dimethyl-m-isopropenyl benzyl isocyanate.
***IGEPAL is a trademark of GAF Corp., and SIPONIC is a trademark of Alcolac Corp.

Tables II and III list relevant properties of the products of Examples 1–10.

With reference to Table II, the percent nonvolatile materials of each solution polymer is generally about 5.0. The polymers ranged from translucent to opaque in aqueous solution. An aqueous solution including the control polymer of Example 1 was clear.

The Brookfield viscosities of the products of Examples 1–10 were from about 9,000 cps to about 200,000 cps at 10 revolutions per minute. The Brookfield viscosities of the products of Examples 1–10 were from about 5,500 cps to about 76,000 cps at 50 revolutions per minute. Viscosities were determined on an RVT viscometer with a No. 7 spindle at 25 degrees C.

As can be observed from the data in Table II, the product of each Example exhibited properties rendering it suitable for use as a thickening agent.

TABLE II

| | VISCOSITY TEST RESULTS | | | |
|---|---|---|---|---|
| | NON-VOLATILE MATERIALS* | | BROOKFIELD VISCOSITY** | |
| EXAMPLE | (NVM) (percent) | PHYSICAL APPEARANCE | 10 RPM (cps) | 50 RPM (cps) |
| 1 | 5.01 | clear | 18,800 | 9,440 |
| 2 | 3.07 | sl translucent | 42,000 | 32,960 |
| 3 | 5.13 | sl translucent | 72,400 | 38,560 |
| 4 | 4.97 | opaque | 8,800 | 5,520 |
| 5 | 4.95 | sl opaque | 17,600 | 9,200 |
| 6 | 5.01 | sl opaque | 59,600 | 22,640 |
| 7 | 5.05 | translucent | 198,000 | 75,760 |
| 8 | 5.03 | sl opaque | 61,200 | 23,520 |
| 9 | 5.15 | translucent | 53,600 | 18,720 |
| 10 | 5.17 | opaque | 28,000 | 12,240 |

*The theoretical non-volatile content of each sample was determined to be about 5 percent by weight.
**On RVT viscometer, spindle #7, conducted at 25 degrees C.

Referring to Table III, the sensitivities of the control polymer (Example 1) and a modified-polyacrylamide of this invention (Example 7) to pH and salt concentration were determined.

As expected, the control polyacrylamide of Example 1, at about 3.8 percent nonvolatile materials, showed little change in viscosity with variations in pH and salt (sodium ion) concentration.

The modified-polyacrylamide of Example 7 also showed little change in viscosity with variations in pH and salt concentration, despite the fact that the polymer of Example 7 was used at only about 2.0 percent nonvolatile materials.

The alkali-soluble latex thickeners of U.S. Pat. No. 4,514,522, however, even at low (0.50 percent) nonvolatile materials were extremely sensitive to pH and salt concentrations. In particular, the viscosities of aqueous solutions including the thickeners of the foregoing patent decreased dramatically as the pH was decreased from about 9.0 to about 3.8. Moreover, the viscosities of aqueous solutions including such thickeners also decreased in a dramatic manner with increasing salt concentration.

Thus, the nonionic associative thickeners of this invention are stable in the presence of high pH (at least as high as about pH 9.3), low pH (at least as low as about pH 4.4) and at high and low salt concentrations. Viscosities greater than 10 times the viscosity of the polyacrylamide control polymer were obtained (see Table II) with no viscosity sensitivity to pH and no viscosity loss upon the addition of salt.

cous aqueous solution at percent solids which can be used directly as a fluid loss additive in drilling operations.

Unlike the various carboxyl-functional polymers typically used in oil recovery for fluid loss control, the nonionic associative thickeners of this invention improve tolerance to salts including gypsum and sodium chloride which are frequently encountered in drilling operations. The present thickeners also include ethoxylated groups which impart improved lubricity, thus reducing drilling energy requirements. In addition, the nonionic urethane monomer provides improved thermal and hydrolytic stability in hot wells as compared with some ester-functional and cellulosic polymers currently being used for this purpose.

What is claimed is:

1. A nonionic associative thickener which is a water soluble polymer of:
   (a) about 40 to 98 weight percent of a water-soluble monoethylenically unsaturated monomer; and
   (b) about 2 to 60 weight percent of a nonionic urethane monomer comprising the urethane reaction product of a monohydric nonionic surfactant and a monoethylenically unsaturated monoisocyanate containing styryl unsaturation.

2. The nonionic associative thickener of claim 1 wherein the monoethylenically unsaturated monomer is present in an amount of 60 to 95 weight percent and the nonionic urethane monomer is present in an amount of

TABLE III

| | | SALT AND pH SENSITIVITY | | | | |
|---|---|---|---|---|---|---|
| | | AQUEOUS SOLIDS | | SODIUM ION | BROOKFIELD VISCOSITY | |
| EXAMPLE | THICKENER TYPE | CONTENT (percent) | pH | CONC. (ppm) | 10 RPM (cps) | 50 RPM (cps) |
| 1 | polyacrylamide | 3.84 | 8.5 | 0 | 1400 | 1200 |
| 1 | polyacrylamide | 3.84 | 8.5 | 2500 | 1440 | 1240 |
| 1 | polyacrylamide | 3.84 | 4.7 | 2500 | 1480 | 1232 |
| 7 | modified-polyacrylamide | 1.86 | 4.4 | 0 | 1200 | 840 |
| 7 | modified-polyacrylamide | 1.86 | 4.4 | 2500 | 1160 | 848 |
| 7 | modified-polyacrylamide | 1.86 | 9.3 | 2500 | 1280 | 984 |
| | alkali-soluble latex* | 0.50 | 3.8 | 0 | 4 | 4 |
| | alkali-soluble latex | 0.50 | 9.0 | 0 | 1340 | 424 |
| | alkali-soluble latex | 0.50 | 9.0 | 1000 | 9 | 16 |

*Prepared as described in Example 3 of U.S. Pat. No. 4,514,552 (in particular, using the urethane monomer of Example No. 1-E).

The following Example describes the preparation of a nonionic associative thickener by aqueous solution polymerization that is suitable for use in oil drilling and enhanced oil recovery operations.

EXAMPLE 11

A three-liter flask equipped with a thermometer, heating mantle, thermoregulator and nitrogen inlet is charged with 1500 grams deionized water. The water is heated to 40 degrees C under a light nitrogen sparge. An initiator solution is prepared consisting of 1.0 gram sodium persulfate in 50.0 grams deionized water. A reductant solution is prepared consisting of 0.5 grams sodium metabisulfite in 50.0 grams deionized water. At 50 degrees C, 320.0 grams acrylamide and 80.0 grams of a m-TMI adduct of Igepal CO-990 (100 mole ethyoxylate of nonylphenol) are charged to the reactor and maintained for 15 minutes with nitrogen sparge. The initiator and reductant solutions are then added, and the reactants are allowed to exotherm freely to about 85 degrees C. The polymer solution is maintained at 85 degrees C for an additional 30 minutes or until the free monomer concentration is less than 0.5 percent by weight. The final polymer product is a moderately vis- 5 to 40 weight percent.

3. The nonionic associative thickener of claim 1 wherein the monoethylenically unsaturated monomer is present in an amount of 70 to 95 weight percent and the nonionic urethane monomer is present in an amount of 5 to 30 weight percent.

4. The nonionic associative thickener of claim 1 wherein the monoethylenically unsaturated monomer is acrylamide.

5. The nonionic associative thickener of claim 1 wherein the monoethylenically unsaturated monomer is N,N-dimethyl acrylamide.

6. The nonionic associative thickener of claim 1 wherein the monoethylenically unsaturated monomer is vinyl pyrrolidone.

7. The nonionic associative thickener of claim 1 wherein the monoethylenically unsaturated monomer is hydroxyethyl acrylate.

8. The nonionic associative thickener of claim 1 wherein said monohydric nonionic surfactant is an ethoxylated aliphatic alcohol or alkyl phenol in which a carbon chain containing at least 6 carbon atoms provides the hydrophobic portion of said surfactant.

9. The nonionic associative thickener of claim 1 wherein said monohydric nonionic surfactant has the formula:

$$R-O+CH_2-CHR'O)_{\overline{m}}(CH_2-CH_2O)_{\overline{n}}H$$

in which R is an alkyl group containing 6-22 carbon atoms or an alkaryl group containing 8-22 carbon atoms, R' is $C_1C_4$ alkyl, n is an average number from about 6-150, and m is an average number of from 0-50 provided n is at least as great as m and the sum of n and m equals 150.

10. The nonionic associative thickener of claim 1 wherein said nonionic urethane monomer is the urethane reaction product of said monohydric nonionic surfactant and alpha, alpha-dimethyl-m-isopropenylbenzyl isocyanate.

11. The nonionic associative thickener of claim 1 wherein said nonionic urethane monomer is the urethane reaction product of said monohydric nonionic surfactant and alpha, alpha-dimethyl-p-isopropenyl benzyl isocyanate.

12. The nonionic associative thickener of claim 1 wherein said nonionic urethane monomer is a urethane of an ethyoxylated phenol selected from the group consisting of octyl phenol, nonyl phenol and dinonyl phenol.

13. The nonionic associative thickener of claim 12 wherein said ethyoxylated phenol includes from about 5 and 150 moles of adducted ethylene oxide per mole of ethoxylated phenol.

14. The nonionic associative thickener of claim 13 wherein said ethoxylated nonyl phenol includes from 10 to 60 moles of adducted ethylene oxide per mole of ethoxylated phenol.

15. An aqueous solution including the nonionic associative thickener of claim 1.

16. The nonionic associative thickener of claim 1 wherein said copolymer is made by copolymerization in aqueous solution.

* * * * *